US011902845B2

(12) United States Patent
Srinivasan et al.

(10) Patent No.: US 11,902,845 B2
(45) Date of Patent: Feb. 13, 2024

(54) SYSTEMS AND METHODS FOR SEAMLESS SWITCHING OF DEFAULT DATA RADIO (71) Applicant: Honeywell International Inc., Charlotte, NC (US)

(72) Inventors: Divya Swarup Giriyappa Srinivasan, Bangalore (IN); Thomas D. Judd, Woodinville, WA (US)

(73) Assignee: Honeywell International Inc., Charlotte, NC (US)

(*) Notice: Subject to any disclaimer, the term of this patent is extended or adjusted under 35 U.S.C. 154(b) by 167 days.

(21) Appl. No.: 17/338,984

(22) Filed: Jun. 4, 2021

(65) Prior Publication Data
US 2022/0338086 A1 Oct. 20, 2022

(30) Foreign Application Priority Data
Apr. 15, 2021 (IN) .............................. 202111017550

(51) Int. Cl.
H04W 36/18 (2009.01)
H04W 36/30 (2009.01)
H04W 36/00 (2009.01)

(52) U.S. Cl.
CPC ....... H04W 36/18 (2013.01); H04W 36/0069 (2018.08); H04W 36/30 (2013.01)

(58) Field of Classification Search
CPC ............ H01Q 3/24; H01Q 1/28; H01Q 25/00; H01Q 21/28; H01Q 1/285; H04B 7/18506; H04B 7/0817; H04B 7/0825; H04B 7/18526; H04W 84/005; H04W 88/08; H04W 36/0061; H04W 36/18; H04W 36/08; H04W 36/22; H04W 84/06;
(Continued)

(56) References Cited

U.S. PATENT DOCUMENTS 9,867,095 B2    1/2018   Lee et al.
2012/0099625 A1* 4/2012  Djadi ................ H04B 1/38
                                                 375/219

(Continued)

FOREIGN PATENT DOCUMENTS

CN    111132080 A      5/2020
CN    111464250 A      7/2020
WO    2013010361 A1    1/2013

Primary Examiner — Allahyar Kasraian
(74) Attorney, Agent, or Firm — Fogg & Powers LLC (57) ABSTRACT Systems and methods for seamless switching of data radios are provided herein. In one example, a communications system includes first and second data radios communicatively coupled to first and second antennas at first and second positions on a vehicle, respectively. The first and second data radios are tuned to the same frequency for data communications. The communications system includes at least one processor communicatively coupled to a memory, the first data radio, and the second data radio. The at least one processor is configured to: monitor one or more parameters for the first and second data radios; determine whether the first data radio or the second data radio has better current performance based on a comparison of the one or more parameters for the first and second data radios; and switch from the first data radio to the second data radio for primary data communications based on the determination.

20 Claims, 3 Drawing Sheets (58) Field of Classification Search
CPC ..... H04W 36/30; H04W 64/006; H04W 4/02; H04W 36/0066
See application file for complete search history.

(56) References Cited

U.S. PATENT DOCUMENTS

| | | | |
|---|---|---|---|
| 2012/0231788 A1* | 9/2012 | Kaminski | H01Q 1/246 343/705 |
| 2013/0321201 A1 | 12/2013 | Savoy et al. | |
| 2015/0118983 A1* | 4/2015 | Malaga | H04B 1/1638 455/179.1 |
| 2017/0302798 A1* | 10/2017 | Hunter | H04M 3/533 |
| 2018/0124671 A1* | 5/2018 | Zhang | H04B 7/18506 |
| 2018/0288731 A1* | 10/2018 | Akula | H04W 64/00 |
| 2020/0037128 A1 | 1/2020 | Lu et al. | |
| 2020/0266850 A1 | 8/2020 | Eaton et al. | |
| 2022/0052724 A1* | 2/2022 | Kim | H04B 1/3822 |

* cited by examiner

SYSTEMS AND METHODS FOR SEAMLESS SWITCHING OF DEFAULT DATA RADIO

CROSS-REFERENCE TO RELATED APPLICATIONS

This application claims the benefit of India Provisional Application Serial No. 202111017550, filed Apr. 15, 2021, and titled "SYSTEMS AND METHODS FOR SEAMLESS SWITCHING OF DEFAULT DATA RADIO," which is hereby incorporated herein by reference.

BACKGROUND

The Aircraft Communications Addressing and Reporting System (ACARS) very high frequency (VHF) link used for datalink communications is designed to be a subnetwork used by various entities for aircraft communications with airlines, air traffic control, information services, and the like. In particular, an ACARS VHF link is used to exchange datalink messages (for example, Air Traffic Control (ATC), Airline Operational Communications (AOC), etc.) between an aircraft and ground center(s) (for example, operations center, air traffic control center, etc.).

An aircraft includes VHF radios to conduct voice and data communications with a ground center. Typically, commercial aircraft configurations include two VHF radios configured for voice communications and a single VHF radio configured for datalink communications. The VHF radios typically included on commercial aircraft can be used for either voice communications or data communications, but the VHF radios are configured for only one of voice communications or data communications at a time.

SUMMARY

In one example, a communications system includes a first data radio communicatively coupled to a first antenna at a first position on a vehicle. The communications system further includes a second data radio communicatively coupled to a second antenna at a second position on the vehicle different from the first position. The first and second data radios are tuned to the same frequency for data communications. The communications system further includes at least one processor communicatively coupled to a memory, the first data radio, and the second data radio. The at least one processor is configured to monitor one or more parameters for the first data radio and the second data radio and determine whether the first data radio or the second data radio has better current performance based on a comparison of the one or more parameters for the first data radio and the second data radio. The at least one processor is further configured to switch from the first data radio to the second data radio for primary data communications based on the determination.

DRAWINGS

Understanding that the drawings depict only some embodiments and are not therefore to be considered limiting in scope, the exemplary embodiments will be described with additional specificity and detail using the accompanying drawings, in which.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The example systems and methods described herein provide seamless switching between data radios and improve data radio performance compared to the typical implementations. The example systems and methods include two data radios communicatively coupled to different antennas at different locations and at least one processor configured to determine when to switch between the data radios based on one or more parameters for the data radios. In some examples, the at least one processor is configured to determine which data radio currently offers better performance and switches to that data radio for primary data communications. In some examples, the data radios are multi-mode data radios that are configured to perform voice communications and data communications at the same time. In such examples, the multi-mode data radios provide better data radio performance, and the overall weight, size, and cost of the required radio equipment for voice and data communications is reduced compared to the typical implementations.

Figure 1A:
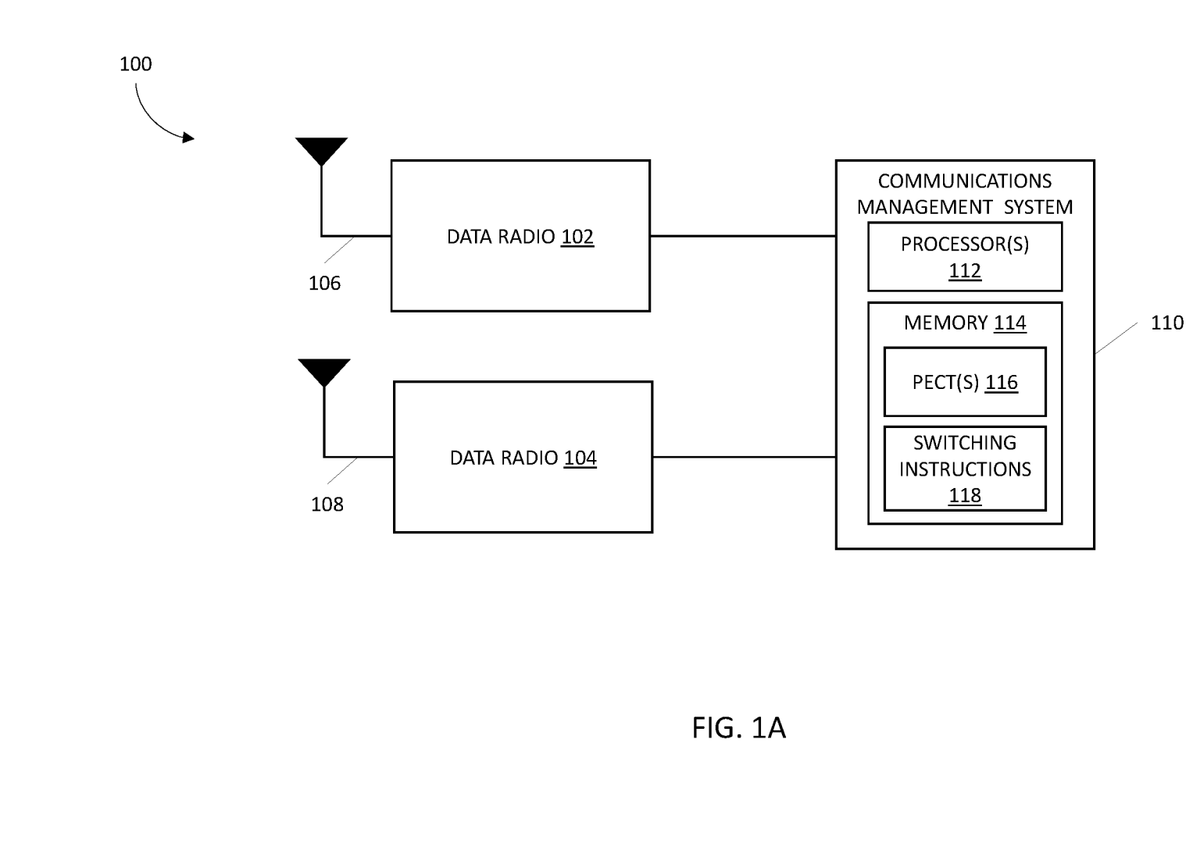
FIG. 1A-1B are block diagrams of example communications systems for seamless switching of a default data radio.
Figure 1B:
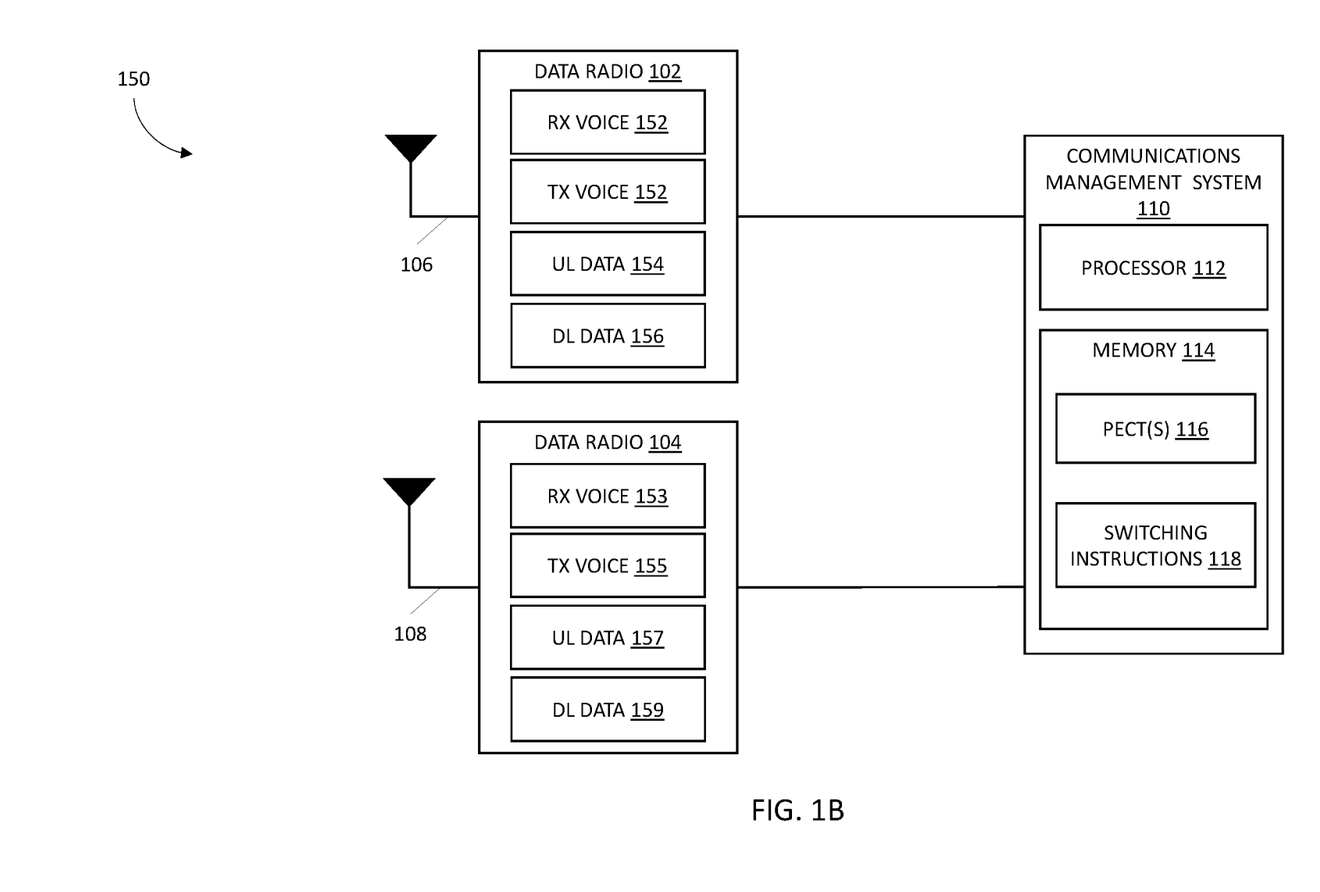

FIGS. 1A-1B illustrate block diagrams of example communications systems 100, 150. The communications systems 100, 150 include a first data radio 102, a second data radio 104, a first antenna 106, a second antenna 108, and a communications management system 110 that includes at least one processor 112 and a memory 114. Although FIGS. 1A-1B depict two data radios 102, 104 for the communications systems 100, 150, it should be understood that communications systems 100, 150 may include a greater number of data radios (for example, three or more data radios) depending on requirements and desired performance, and the particular depiction of two data radios is therefore illustrated to clarify and explain the principles described throughout the disclosure.

The communications systems 100, 150 may be implemented in a vehicle, or may be physically, electrically, and/or communicatively coupled to a vehicle, for example, to assist the vehicle with establishing communication with other external entities. Such entities may include another vehicle, ground stations, and/or ground centers. In some examples, the vehicle may include an aircraft, and an aircraft is referenced to explain the principles described throughout the disclosure. However, the term vehicle is intended to include all such vehicles falling within the ordinary meaning of the term as understood by one having ordinary skill in the art, which includes, but is not limited to, aerial traversing vehicles (for example, commercial, non-commercial, or recreational aircraft), unmanned or space traversing vehicles (for example, satellites, urban air mobility vehicles), and ground traversing vehicles (for example, automobiles, trucks, motorcycles).

In the examples shown in FIGS. 1A-1B, the communications systems 100, 150 include a first data radio 102 and a second data radio 104. In some examples, the first data radio 102 and the second data radio 104 are very high frequency (VHF) radios that communicate in a frequency range 30 to 300 megahertz (MHz). In some examples, the first data radio 102 and the second data radio 104 are configured for Mode 2 or Mode A operation. The first data radio 102 and the second data radio 104 are each configured to transmit and receive datalink communications. Only one of the data radios is used at a time to transmit downlink data communications (primary data communications) while the other data radio only passively listens to uplink data communications. The first data radio 102 and the second data radio 104 are also configured to transmit and receive voice communications on separate channels from the datalink communications. The first data radio 102 and the second data radio 104 are tuned to the same frequency channel(s) for data communications.

In the examples shown in FIGS. 1A-1B, the first data radio 102 is communicatively coupled to a first antenna 106 and the second data radio 104 is communicatively coupled to a second antenna 108. Signals received from the first antenna 106 are not utilized by the second data radio 104 and signals received from the second antenna 108 are not utilized by the first data radio 102. In some examples, the first antenna 106 is positioned at a first location on a vehicle and the second antenna 108 is positioned at a second location on the vehicle that is different than the first location. In some examples, the first antenna 106 is positioned at the front of the vehicle and the second antenna 108 is positioned at the back of the vehicle. In other examples, the first antenna 106 is positioned on top of the vehicle and the second antenna 108 is positioned on the bottom of the vehicle. For the aircraft specific case, the performance of an antenna positioned at the top of the aircraft is generally better on the ground or near the ground and the performance of an antenna positioned at the bottom of the aircraft is generally better in the air. However, through flight testing, it has been determined that this is not always the case and performance varies during particular stages of flight (for example, climbing after takeoff and descending prior to landing).

In some examples, the first data radio 102 and the second data radio 104 can be implemented using multi-mode data radios (MMDRs). FIG. 1B illustrates a block diagram of an example communications system 150 where the first data radio 102 and the second data radio 104 are implemented using MMDRs. The other components of the communications system 150 operate in a similar manner compared to communications system 100 and accordingly include the same reference numerals.

In the example shown in FIG. 1B, the first data radio 102 includes a receive voice communication path 152, a transmit voice communication path 154, an uplink data communication path 156, and a downlink data communication path 158. Similarly, the second data radio 104 includes a receive voice communication path 153, a transmit voice communication path 155, an uplink data communication path 157, and a downlink data communication path 159.

In some examples using MMDRs, the first data radio 102 and the second data radio 104 are configured to perform voice and data communications simultaneously. For example, the first data radio 102 and the second data radio 104 are each configured to simultaneously receive voice communications via the respective receive voice communication path 152, 153 and receive uplink data communication via the respective uplink data communication path 156, 157. In some examples using MMDRs, the first data radio 102 and the second data radio 104 are each configured to simultaneous transmit voice communications via the respective transmit voice communication path 154, 155 and receive uplink data communications via the respective uplink data communication path 156, 157. However, the first data radio 102 and the second data radio 104 cannot transmit voice communications via the respective transmit voice communication path 154, 155 and transmit downlink data communications via the respective downlink data communication path 158, 159 at the same time. In some examples using MMDRs, the first data radio 102 and the second data radio 104 are configured to queue downlink data communications that are sent via the respective downlink data communication path 158, 159 when the first data radio 102 and the second data radio 104 are transmitting voice communications via the respective transmit voice communication path 154, 155.

The first data radio 102 and the second data radio 104 are tuned to the same data channel frequency for uplink data communications and downlink data communications. While both the first data radio 102 and the second data radio 104 can receive uplink data communications via the respective uplink data communication path 156, 157 at the same time when using MMDRs, only one of the first data radio 102 or the second data radio 104 is used at a time to transmit downlink data communications via the respective downlink data communication path 158, 159. That particular data radio transmitting downlink data communications is referred to as being used for primary data communications.

The strength and quality of the signals received from a ground station or other signal source depend on a multitude of factors. The first data radio 102 and the second data radio 104 will detect/receive different types of signals from multiple ground stations during operation. The signals received by the data radios can include broadcast communications (for example, a Ground Station Information Frame (GSIF)), communications specifically directed to the vehicle that includes the communications systems 100, 150, and/or communications detected by the respective data radio that are not directed to the vehicle that includes the communications systems 100, 150.

In the examples shown in FIGS. 1A-1B, the communications system 100 further includes a communications management system 110 including at least one processor 112 communicatively coupled to a memory 114. The communications management system 110 is configured to receive and process broadcast communications and communications specifically directed to the vehicle that includes the communications systems 100, 150. The communications management system 110 (particularly, the at least one processor 112) is configured to monitor one or more parameters for the first data radio 102 and the second data radio 104 and store the one or more parameters for the first data radio 102 and the second data radio 104 in memory.

In some examples, the one or more parameters for the first data radio 102 and the second data radio 104 include radio frequency signal parameters. In some examples, the radio frequency signal parameters for the first data radio 102 and the second data radio 104 include channel utilization, which indicates the channels currently in use by the respective data radio and can be provided by the first data radio 102 and the second data radio 104 at periodic intervals (for example, every second). In some examples, the radio frequency signal parameters include signal strength, signal quality, and/or noise parameters for the signals received by the respective data radios. In some examples, these radio frequency signal parameters are measured by the first data radio 102 and the second data radio 104, and the first data radio 102 and the second data radio 104 output these radio frequency signal parameters to the communications management system 110. In some examples, the first data radio 102 and the second data radio 104 are configured to provide signal strength, signal quality, and/or noise parameters for each signal received by the respective data radio.

In some examples, the one or more parameters for the first data radio 102 and the second data radio 104 include parameters that are generated by a different entity than the first data radio 102 or the second data radio 104, and some of these parameters are passed through the first data radio 102 and the second data radio 104 to the at least one processor 112. In some examples, the one or more parameters for the first data radio 102 and the second data radio 104 include a service type of ground station that sent the data communication received by the respective data radio, which can indicate the modes of communication supported by the particular ground station. In some examples, the one or more parameters for the first data radio 102 and the second data radio 104 include a service provider (for example, ARINC or SITA) associated with the signals received for the respective data radio. In some such examples, the one or more parameters for the first data radio 102 and the second data radio 104 include identification information (for example, a ground station address and/or ground station identifier) or location for the ground station that transmitted the signal received by the respective data radio. The above examples of the one or more parameters for the first data radio 102 and the second data radio 104 in this paragraph can be obtained in a broadcast message (for example, a GSIF) received by the data radios 102, 104. In some examples, the one or more parameters for the first data radio 102 and the second data radio 104 include a number of ground stations heard by the respective data radio, which can be determined by the first data radio 102 and the second data radio 104 or by the communications management system 110 based on the outputs from the first data radio 102 and the second data radio 104.

In some examples, the one or more parameters for the first data radio 102 and the second data radio 104 include a radio health parameter for the respective data radio, which can include an indication of the number of times a data radio has reset or failed. In some such examples, the radio health parameter includes an indication regarding whether the data radio is currently providing signals to the communications management system 110 or whether the respective data radio is currently in a fault state.

In some examples, the one or more parameters for the first data radio 102 and the second data radio 104 include latency of the data communications received by a respective data radio via a respective antenna. In some such examples, the latency of the data communications can be specific to data communications received from particular ground stations. In other such examples, the latency of the data communications can be an average of latency for data communications received and processed by the communications management system 110.

In some examples, the one or more parameters for the first data radio 102 and the second data radio 104 include an indication regarding consistency of uplink data communications received. In some such examples, the indication regarding consistency of uplink data communications received is ground station specific and indicates the frequency of uplink data communications received from a particular ground station. In other such examples, the indication regarding consistency of uplink data communications received is data radio specific and indicates the frequency of uplink data communications received from any ground station by the particular data radio.

Other parameters could also be monitored by the communications management system 110 in addition to those discussed herein. Further, any combination of the examples of the one or more parameters for the first data radio 102 and the second data radio 104 can be utilized by the communications management system 110 for the switching decision discussed below.

The at least one processor 112 of the communications management system 110 is configured to store the one or more parameters for the first data radio 102 and the one or more parameters for the second data radio 104 in memory (for example, memory 114). In some examples, the at least one processor 112 is configured to store the one or more parameters for the first data radio 102 in a first peer entity contact table (PECT) 116 and to store the one or more parameters for the second data radio 104 in a second PECT 116. It should be understood that the one or more parameters for the first data radio 102 and the second data radio 104 could also be stored in separate memories and in different formats than a PECT.

It can be generally beneficial to associate certain parameters with each other in the PECTs 116 to make comparison of the parameters for the first data radio 102 and the parameters of the second data radio 104 easier. In some examples, the signal strength, signal quality, and/or noise parameter for a signal received by the respective data radio is associated in the PECTs 116 with identification information for the ground station that transmitted the signal. In some examples, a service type supported by a ground station, a service provider associated with a ground station, consistency of uplink data communications from the ground station, and/or latency can be associated in the PECTs 116 with identification information for the ground station that transmitted signals received by the respective data radio.

Some parameters for the first data radio 102 and the second data radio 104 need not be associated with other parameters in the PECTs 116 for comparison. For example, channel utilization, a number of ground stations heard by the respective data radio, a radio heath parameter for the respective data radio, and/or data radio specific consistency of uplink communications received can be individual fields in the PECTs 116 that are not necessarily associated with other parameters in the PECTs 116.

In some examples, the at least one processor 112 is configured to save the current value of the one or more parameters for the first data radio 102 and the one or more parameters for the second data radio 104 in memory. For example, current values of parameters like channel utilization, radio health parameters for the respective data radio, service type of ground station in communication with the respective data radio, service provider for signals received for the respective data radio, ground station location, and/or a number of ground stations heard by the respective data radio can be saved in memory.

In other examples, the at least one processor 112 is configured to save a combination of multiple values of the one or more parameters for the first data radio 102 and the one or more parameters for the second data radio 104 in memory. For example, a running average, weighted average, or other combination of multiple measurements for parameters like signal strength, signal quality, noise, and/or latency for signals received from particular ground stations by the respective data radios can be saved in memory. By using a combination of measurements rather than just the current value, unnecessary or undesirable switching can be avoided based on a single faulty or misleading measurement.

In some examples, the at least one processor 112 is configured to update a single entry for each of the one or more parameters over time. For example, the at least one processor 112 can replace an older signal quality parameter for a signal received from a particular ground station with an updated signal quality parameter of the next signal received from that particular ground station. In other examples, the at least one processor 112 is configured to save multiple entries for the one or more parameters that are time-stamped. In some such examples, the multiple entries are sorted in chronological (or reverse chronological) order and newer entries are weighted more heavily when determining what data radio offers better performance. In some examples, the at least one processor 112 is configured to implement an aging algorithm to remove older entries for the one or more parameters from memory. For example, the at least one processor 112 can remove entries for a parameter after a predetermined amount of time (for example, 15-30 minutes) has passed since the parameter was observed.

Due to the different locations of the first antenna 106 and the second antenna 108, the strength and quality of the signals received from ground stations or other signal sources can be different at the first antenna 106 compared to the second antenna 108. Similarly, the number and types of ground stations heard by the first data radio 102 via the first antenna 106 may be different than the number and types of ground stations heard by the second data radio 104 via the second antenna 108. Since the first data radio 102 exclusively utilizes signals received at the first antenna 106 and the second data radio 104 exclusively utilizes signals received at the second antenna 108, it is desirable for the communications system 100 to automatically switch between the first data radio 102 and the second data radio 104 to optimize the quality of communications.

The at least one processor 112 is configured to execute switching instructions 118 to determine which data radio to select based the one or more parameters for the first data radio 102 and the one or more parameters for the second data radio 104. The switching decision is generally made less frequently than the frequency at which the one or more parameters are gathered. In some examples, the switching decision is made every 30-60 seconds. Other time ranges could also be used depending on requirements and desired performance.

In some examples, a single parameter for the first data radio 102 and a single parameter for the second data radio 104 is used for the determination. In other examples, two or more parameters for the first data radio 102 are compared to corresponding parameters for the second data radio 104 for the determination.

In some examples where the at least one processor 112 compares two or more parameters, the at least one processor 112 is configured to weight at least one parameter higher than the other parameters. For example, the at least one processor 112 can weight signal strength, signal quality, and/or noise parameters higher than the number of ground stations heard by the data radio, consistency of uplink data communications received, etc.

In some examples, the current value of one of the parameters may be determinative such that it disqualifies a data radio from use. For example, if one of the first data radio 102 or the second data radio 104 indicates poor radio health (a fault or offline status), then the other data radio is automatically selected for primary data communications.

In some examples, the comparison of the one or more parameters for the first data radio 102 and the one or more parameters for the second data radio 104 is ground station specific. In such examples, one or more parameters associated with particular ground station identification information in the PECTs 116 are compared for the first data radio 102 and the second data radio 104. In some examples, the data radio with the highest score (for example, based on a combination of parameters) for that particular ground station is selected. In general, the data radio that has the highest value for positive parameters (for example, signal strength, signal quality, number of ground stations heard, radio health, consistency of received uplinks) or the lowest value for negative parameters (noise, latency) is considered to provide the best current performance.

In some examples, the at least one processor 112 is configured to switch to or maintain the first data radio 102 for primary data communications if it is determined that the first data radio 102 offers better current performance and to switch to or maintain the second data radio 104 for primary data communications if it is determined that the second data radio 104 offers better current performance. Switching to a particular data radio for primary data communications includes connecting to the current ground station using the same frequency as the previous data radio used for primary data communications. In some examples, switching to a particular data radio for primary data communications includes using the same mode (for example, Mode 2) as the previous data radio used for primary data communications. In some examples, switching to a particular data radio for primary data communications includes maintaining the connection between the previous data radio used for primary data communications and the ground station until the new connection is successfully established.

If the performance of the first data radio 102 and the second data radio 104 is within a threshold range of each other, then the at least one processor 112 can be configured to default to a particular data radio. In some examples, the at least one processor 112 is configured to default to the current data radio to reduce the frequency of switching between the data radios. In some examples, for aircraft specific implementations, the at least one processor 112 is configured to default to the data radio communicatively coupled to the bottom most antenna when in the air and to the data radio communicatively coupled to the topmost antenna when on the ground or near the ground.

The at least one processor 112 can also utilize other information in addition to the one or more parameters for the first data radio 102 and the second data radio 104 in making the determination. In some examples, the at least one processor 112 is configured to implement logic that selects a particular data radio based on flight path, ground station location, velocity of the vehicle, supported service provider(s), or the like.

In some examples, the communications management system 110 also selects a ground station based on information in the PECTs 116. In some such examples, the at least one processor 112 is configured to select a ground station based on the signal strength, signal quality, noise, location of the ground station, and/or frequency of uplink communication parameters in the PECTs 116. Information such as, for example, the flight path, velocity, and destination of the vehicle can be used in addition to (or instead of) the information in the PECTs 116 to select the ground station.

Figure 2:
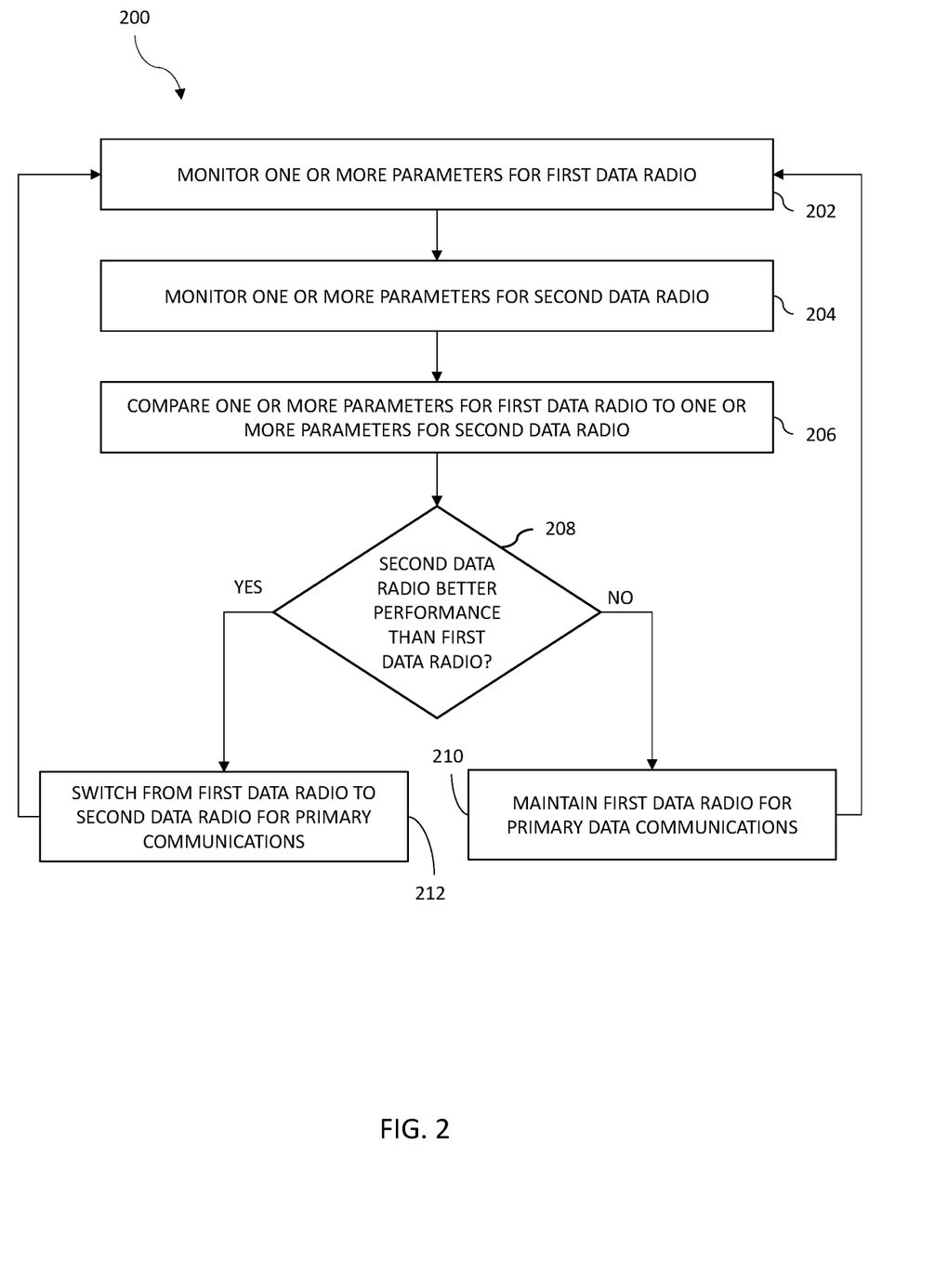
FIG. 2 is a flow diagram of an example method for seamless switching of a default data radio.

FIG. 2 illustrates a flow diagram of an example method 200 for seamless switching between data radios. The common features discussed above with respect to communication systems 100, 150 with respect to FIGS. 1A-1B can include similar characteristics to those discussed with respect to method 200 and vice versa. In some examples, the method 200 is performed using one or more components of the communications system 100, 150. For the purposes of description of the method 200, it is assumed that the first data radio is currently used for primary data communications.

The method 200 includes monitoring one or more parameters for a first data radio communicatively coupled to a first antenna (block 202) and monitoring one or more parameters for a second data radio communicatively coupled to a second antenna (block 204). In some examples, the one or more parameters for the first data radio and the second data radio include radio frequency signal parameters including, but not limited to, signal strength, signal quality, and/or noise. In some examples, the one or more parameters for the first data radio and the second data radio include parameters that are generated by a different entity than the first data radio or the second data radio. In some examples, these parameters include, but are not limited to, a service type of ground station in communication with the respective data radio, a service provider (for example, ARINC or SITA) associated with the signals received for the respective data radio, identification information (for example, a ground station address and/or ground station identifier) or location for the ground station that transmitted the signal received by the respective data radio, and/or a number of ground stations heard by the respective data radio. Other parameters discussed above, such as a radio health parameter, can also be monitored for the first data radio and the second data radio.

The method 200 further includes comparing the one or more parameters for the first data radio with the one or more parameters for the second data radio (block 206). In some examples, comparing the one or more parameters for the first data radio with the one or more parameters for the second data radio includes determining whether the parameter(s) for the first data radio or the parameter(s) for the second data radio are greater (for positive parameters) or lesser (for negative parameters). For example, this can include consideration of the signal strength, signal quality, noise, or other parameters discussed above. In some examples, comparing the one or more parameters for the first data radio with the one or more parameters for the second data radio includes determining whether a difference between the parameter(s) for the first data radio and the parameter(s) for the second data radio exceeds a threshold that merits switching the data radios. The threshold can be based on a percentage (for example, 10%) improvement over current performance that would provide a meaningful difference. Other thresholds can be used according to desired performance and requirements.

The method 200 further includes determining whether the second data radio has better performance than the first data radio based on the comparison of the one or more parameters for the first data radio and the one or more parameters for the second data radio (block 208). In some examples, additional information (for example, flight path, ground station location, velocity of the vehicle, supported service provider(s), or the like) beyond the one or more parameters for the first data radio and the second data radio is used for determining whether the second data radio has better current performance than the first data radio.

The method 200 further includes maintaining the first data radio for primary data communications in response to the determination that the second data radio does not have better performance than the first data radio (block 210). In this scenario, a switch is not made and the connection between the first data radio and the current ground station using a current frequency is maintained.

The method 200 further includes switching from the first data radio to the second data radio for primary data communications in response to the determination that the second data radio has better current performance than the first data radio (block 212). In this scenario, switching from the first data radio to the second data radio for primary data communications includes connecting the second data radio to the current ground station using the same frequency used by the first data radio. In some examples, the connection between the first data radio and the ground station is maintained until the connection with the second data radio is successfully established. In some examples, a connection is successfully established when a physical connection and a logical connection are completed between the data radio and the ground station.

The method 200 repeats blocks 202-212 in perpetuity during operation of the vehicle that includes the communications system. In some examples, blocks 202-204 are performed more frequently than blocks 206-212. For example, blocks 202-204 can be performed every second and blocks 206-212 can be performed every 30-60 seconds. Other time periods can be used depending on desired performance and requirements.

The systems and methods described herein improve data communications by seamlessly switching between different data radios in a manner that does not interfere with voice or data communications. In some examples, the systems and methods described herein also reduce the size, weight, and cost of radio equipment on a vehicle by utilizing two multi-mode data radios to replace the functionality of three distinct VHF radios in typical implementations.

In various aspects, system elements, method steps, or examples described throughout this disclosure (such as the data radios, communications management system, or components thereof, for example) may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions, used in a distributed antenna system.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a communications system, comprising: a first data radio communicatively coupled to a first antenna at a first position on a vehicle; a second data radio communicatively coupled to a second antenna at a second position on the vehicle different from the first position, wherein the first data radio and the second data radio are tuned to the same frequency for data communications; and at least one processor communicatively coupled to a memory, the first data radio and the second data radio; wherein the at least one processor is configured to: monitor one or more parameters for the first data radio and the second data radio; determine whether the first data radio or the second data radio has better current performance based on a comparison of the one or more parameters for the first data radio and the second data radio; and switch from the first data radio to the second data radio for primary data communications based on the determination.

Example 2 includes the communications system of Example 1, wherein the one or more parameters include channel utilization for the respective data radio, noise for signals received for the respective data radio, signal strength for signals received for the respective data radio, and/or a signal quality parameter for signals received for the respective data radio.

Example 3 includes the communications system of any of Examples 1-2, wherein the one or more parameters include radio health for the respective data radio, a service type of ground station in communication with the respective data radio, a service provider for signals received for the respective data radio, a ground station location, a number of ground stations heard by the respective data radio, and/or latency of communications received by the respective data radio.

Example 4 includes the communications system of any of Examples 1-3, wherein the communications system is positioned on an aircraft, wherein the first antenna is positioned at a first location on the aircraft and the second antenna is positioned at a second location on the aircraft different than the first location.

Example 5 includes the communications system of any of Examples 1-4, wherein the at least one processor is further configured to: generate a respective peer entity contact table for the first data radio and the second data radio based on the one or more monitored parameters; and determine whether the first data radio or the second data radio has better current performance by comparing the peer entity contact tables for the first data radio and the second data radio.

Example 6 includes the communications system of any of Examples 1-5, wherein the at least one processor is further configured to maintain a connection between the first data radio and a first ground station during a switch from the first data radio to the second data radio for primary data communications.

Example 7 includes the communications system of any of Examples 1-6, wherein the first data radio and the second data radio are very high frequency radios.

Example 8 includes the communications system of any of Examples 1-7, wherein the first data radio and the second data radio are multi-mode radios configured to simultaneously perform voice communications and data communications.

Example 9 includes the communications system of Example 8, wherein the first data radio and the second data radio each include: a receive voice communication path; a transmit voice communication path; an uplink data communication path; and a downlink data communication path.

Example 10 includes the communications system of Example 9, wherein the first data radio and the second data radio are each configured to: simultaneously receive signals via the receive voice communication path and receive uplink signals via the uplink data communication path; simultaneously transmit signals via the transmit voice communication path and receive uplink signals via the uplink data communication path; and simultaneously transmit downlink signals via the downlink data communication path and receive signals via the receive voice communication path.

Example 11 includes the communications system of any of Examples 9-10, wherein the first data radio and the second data radio are each configured to queue downlink data communications via downlink data communication path in response to a transmission via the transmit voice communication path.

Example 12 includes a communications management system, comprising: a first input configured to be communicatively coupled to a first data radio; a second input configured to be communicatively coupled to a second data radio; and at least one processor communicatively coupled to a memory, the first input, and the second input, wherein the at least one processor is configured to: monitor one or more parameters for the first data radio coupled to a first antenna and one or more parameters for the second data radio coupled to a second antenna; compare the one or more parameters for the first data radio with the one or more parameters for the second data radio; determine whether the first data radio or the second data radio has better current performance based on the comparison of the one or more parameters for the first data radio with the one or more parameters for the second data radio; switch to or maintain the first data radio for primary data communications in response to a determination that the first data radio has better current performance; and switch to or maintain the second data radio for primary data communications in response to a determination that the second data radio has better current performance.

Example 13 includes the communications management system of Example 12, wherein the one or more parameters for the first data radio and the one or more parameters for the second data radio include channel utilization for the respective data radio, noise for signals received for the respective data radio, signal strength for signals received for the respective data radio, and/or a signal quality parameter for signals received for the respective data radio.

Example 14 includes the communications management system of any of Examples 12-13, wherein the one or more parameters for the first data radio and the one or more parameters for the second data radio include radio health for the respective data radio, a service type of ground station in communication with the respective data radio, a service provider for signals received for the respective data radio, a ground station location, a number of ground stations heard by the respective data radio, and/or latency of communications received by the respective data radio.

Example 15 includes the communications management system of any of Examples 12-14, wherein the communications management system is positioned on an aircraft.

Example 16 includes the communications management system of any of Examples 12-15, wherein the at least one processor is further configured to: generate a respective peer entity contact table for the first data radio and the second data radio based on the one or more monitored parameters; and determine whether the first data radio or the second data radio has better current performance by comparing the peer entity contact tables for the first data radio and the second data radio.

Example 17 includes the communications management system of any of Examples 12-16, wherein the at least one processor is further configured to maintain a connection between the first data radio and a first ground station during a switch from the first data radio to the second data radio for primary data communications.

Example 18 includes a method, comprising: monitoring one or more parameters for a first data radio communicatively coupled to a first antenna; monitoring one or more parameters for a second data radio communicatively coupled to a second antenna, wherein the first data radio and the second data radio are tuned to the same frequency for data communications; comparing the one or more parameters for the first data radio and the one or more parameters for the second data radio; determining whether the first data radio or the second data radio has better current performance based on the comparison of the one or more parameters for the first data radio and the one or more parameters for the second data radio; and switching from the first data radio to the second data radio for primary data communications in response to a determination that the second data radio has better current performance.

Example 19 includes the method of Example 18, further comprising: generating a respective peer entity contact table for the first data radio and the second data radio based on the one or more monitored parameters; wherein comparing the one or more parameters for the first data radio and the one or more parameters for the second data radio includes comparing the peer entity contact tables for the first data radio and the second data radio.

Example 20 includes the method of any of Examples 18-19, further comprising maintaining a connection between the first data radio and a first ground station during a switch from the first data radio to the second data radio for primary data communications.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A communications system, comprising:
    a first data radio communicatively coupled to a first antenna at a first position on a vehicle, wherein the first data radio is configured to transmit and receive datalink communications only via the first antenna;
    a second data radio communicatively coupled to a second antenna at a second position on the vehicle different from the first position, wherein the second data radio is configured to transmit and receive datalink communications only via the second antenna;
    wherein the first data radio and the second data radio are tuned to the same frequency for data communications, wherein the first data radio and the second data radio are configured to receive uplink data communications at the same time, wherein only one of the first data radio and the second data radio is used at a time for primary data communications to transmit downlink data communications; and
    at least one processor communicatively coupled to a memory, the first data radio and the second data radio;
    wherein the at least one processor is configured to:
        monitor one or more parameters for the first data radio and the second data radio;
        determine whether the first data radio or the second data radio has better current performance based on a comparison of the one or more parameters for the first data radio and the second data radio; and
        switch from the first data radio to the second data radio for primary data communications based on the determination.

2. The communications system of claim 1, wherein the one or more parameters include channel utilization for the respective data radio, noise for signals received for the respective data radio, signal strength for signals received for the respective data radio, and/or a signal quality parameter for signals received for the respective data radio.

3. The communications system of claim 1, wherein the one or more parameters include radio health for the respective data radio, a service type of ground station in communication with the respective data radio, a service provider for signals received for the respective data radio, a ground station location, a number of ground stations heard by the respective data radio, and/or latency of communications received by the respective data radio.

4. The communications system of claim 1, wherein the communications system is positioned on an aircraft, wherein the first antenna is positioned at a first location on the aircraft and the second antenna is positioned at a second location on the aircraft different than the first location.

5. The communications system of claim 1, wherein the at least one processor is further configured to:
    generate a respective peer entity contact table for the first data radio and the second data radio based on the one or more monitored parameters; and determine whether the first data radio or the second data radio has better current performance by comparing the peer entity contact tables for the first data radio and the second data radio.

6. The communications system of claim 1, wherein the at least one processor is further configured to maintain a connection between the first data radio and a first ground station during a switch from the first data radio to the second data radio for primary data communications.

7. The communications system of claim 1, wherein the first data radio and the second data radio are very high frequency radios.

8. The communications system of claim 1, wherein the first data radio and the second data radio are multi-mode radios configured to simultaneously perform voice communications and data communications.

9. The communications system of claim 8, wherein the first data radio and the second data radio each include:
a receive voice communication path;
a transmit voice communication path;
an uplink data communication path; and
a downlink data communication path.

10. The communications system of claim 9, wherein the first data radio and the second data radio are each configured to:
simultaneously receive signals via the receive voice communication path and receive uplink signals via the uplink data communication path;
simultaneously transmit signals via the transmit voice communication path and receive uplink signals via the uplink data communication path; and
simultaneously transmit downlink signals via the downlink data communication path and receive signals via the receive voice communication path.

11. The communications system of claim 9, wherein the first data radio and the second data radio are each configured to queue downlink data communications via downlink data communication path in response to a transmission via the transmit voice communication path.

12. A communications management system, comprising:
a first input configured to be communicatively coupled to a first data radio and a first antenna via the first data radio, wherein the first input is configured to transmit and receive datalink communications only via the first data radio and the first antenna;
a second input configured to be communicatively coupled to a second data radio and a second antenna via the second data radio, wherein the second input is configured transmit and receive datalink communications only via the second data radio and the second antenna, wherein the first data radio and the second data radio are tuned to the same frequency for data communications; and
at least one processor communicatively coupled to a memory, the first input, and the second input, wherein the at least one processor is configured to:
monitor one or more parameters for the first data radio coupled to a first antenna and one or more parameters for the second data radio coupled to a second antenna;
compare the one or more parameters for the first data radio with the one or more parameters for the second data radio;
determine whether the first data radio or the second data radio has better current performance based on the comparison of the one or more parameters for the first data radio with the one or more parameters for the second data radio;
in response to a determination that the first data radio has better current performance, switch to or maintain the first data radio for primary data communications where only the first data radio is used to transmit downlink data communications and both the first data radio and the second data radio are used to receive uplink data communications at the same time; and
in response to a determination that the second data radio has better current performance, switch to or maintain the second data radio for primary data communications where only the second data radio is used to transmit downlink data communications and both the first data radio and the second data radio are used to receive uplink data communications at the same time.

13. The communications management system of claim 12, wherein the one or more parameters for the first data radio and the one or more parameters for the second data radio include channel utilization for the respective data radio, noise for signals received for the respective data radio, signal strength for signals received for the respective data radio, and/or a signal quality parameter for signals received for the respective data radio.

14. The communications management system of claim 12, wherein the one or more parameters for the first data radio and the one or more parameters for the second data radio include radio health for the respective data radio, a service type of ground station in communication with the respective data radio, a service provider for signals received for the respective data radio, a ground station location, a number of ground stations heard by the respective data radio, and/or latency of communications received by the respective data radio.

15. The communications management system of claim 12, wherein the communications management system is positioned on an aircraft.

16. The communications management system of claim 12, wherein the at least one processor is further configured to:
generate a respective peer entity contact table for the first data radio and the second data radio based on the one or more monitored parameters; and
determine whether the first data radio or the second data radio has better current performance by comparing the peer entity contact tables for the first data radio and the second data radio.

17. The communications management system of claim 12, wherein the at least one processor is further configured to maintain a connection between the first data radio and a first ground station during a switch from the first data radio to the second data radio for primary data communications.

18. A method, comprising:
monitoring one or more parameters for a first data radio communicatively coupled to a first antenna, wherein the first data radio is configured to transmit and receive datalink communications only via the first antenna;
monitoring one or more parameters for a second data radio communicatively coupled to a second antenna, wherein the second data radio is configured to transmit and receive datalink communications only via the second antenna, wherein the first data radio and the second data radio are tuned to the same frequency for data communications, wherein the first data radio and the second data radio are configured to receive uplink data communications at the same time, wherein only one of the first data radio and the second data radio is used at a time for primary data communications to transmit downlink data communications;

comparing the one or more parameters for the first data radio and the one or more parameters for the second data radio;

determining whether the first data radio or the second data radio has better current performance based on the comparison of the one or more parameters for the first data radio and the one or more parameters for the second data radio; and switching from the first data radio to the second data radio for primary data communications in response to a determination that the second data radio has better current performance.

19. The method of claim 18, further comprising:

generating a respective peer entity contact table for the first data radio and the second data radio based on the one or more monitored parameters;

wherein comparing the one or more parameters for the first data radio and the one or more parameters for the second data radio includes comparing the peer entity contact tables for the first data radio and the second data radio.

20. The method of claim 18, further comprising maintaining a connection between the first data radio and a first ground station during a switch from the first data radio to the second data radio for primary data communications.

* * * * *